(12) United States Patent
Anderson

(10) Patent No.: US 10,176,271 B2
(45) Date of Patent: Jan. 8, 2019

(54) COMMAND LINE INTERFACE BROWSER

(75) Inventor: Dale Howard Anderson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 392 days.

(21) Appl. No.: 12/173,717

(22) Filed: Jul. 15, 2008

(65) Prior Publication Data

US 2010/0017720 A1 Jan. 21, 2010

(51) Int. Cl.
*H04L 29/06* (2006.01)
*G06F 17/30* (2006.01)
*H04L 29/08* (2006.01)

(52) U.S. Cl.
CPC ........ *G06F 17/30899* (2013.01); *H04L 67/08* (2013.01)

(58) Field of Classification Search
CPC .............................. H04L 45/56; H04L 45/00
USPC ....... 709/243, 231, 227, 224, 220, 208, 204, 709/203, 223, 217, 238; 370/465, 389, 370/254, 235; 726/5, 4, 27, 26, 23, 22; 719/319, 315, 310; 717/140, 120, 109, 717/104
See application file for complete search history.

(56) References Cited

U.S. PATENT DOCUMENTS

| 6,983,465 B2 | 1/2006 | Mandal et al. | |
| 2001/0039565 A1* | 11/2001 | Gupta | G06F 9/54 709/203 |
| 2002/0191619 A1* | 12/2002 | Shafer | H04L 45/56 370/401 |
| 2003/0163570 A1* | 8/2003 | Hendley | G06F 9/4443 709/227 |
| 2004/0160464 A1 | 8/2004 | Reyna | |
| 2005/0243066 A1* | 11/2005 | Li | G06F 9/45512 345/168 |
| 2006/0047785 A1 | 3/2006 | Wang et al. | |
| 2007/0011348 A1* | 1/2007 | Bansal et al. | 709/238 |
| 2007/0234228 A1* | 10/2007 | Rao | H04L 41/0806 715/771 |
| 2008/0016501 A1* | 1/2008 | Muhlestein | H04L 41/0233 717/136 |
| 2008/0209316 A1* | 8/2008 | Zandstra | G06F 9/44526 715/700 |

* cited by examiner

*Primary Examiner* — Scott B Christensen
(74) *Attorney, Agent, or Firm* — Griffiths & Seaton PLLC

(57) ABSTRACT

Apparatus, method, and computer program product embodiments for implementing a command line interface (CLI) browser for a client/server pair in a computing environment are provided. A protocol is initialized. The protocol operates on a CLI command, breaking a close coupling between the client/server pair. The protocol facilitates receiving a command query about the CLI command from the client to the server, and sending data representative of the CLI command from the server to the client.

20 Claims, 3 Drawing Sheets

COMMAND LINE INTERFACE BROWSER

BACKGROUND OF THE INVENTION

Field of the Invention

The present invention relates in general to computers, and more particularly to a command line interface browser for a client/server pair in a computing environment.

Description of the Related Art

In computing environments, command line interface (CLI) applications may be used to provide an interface to a computational platform or other application. CLI applications may be found in a variety of computing environment settings. For example, in storage controllers, command line interface (CLI) commands are used to configure hardware resources and to utilize existing resources for several different applications. The configuration of hardware resources involves the creation and deletion of resources such as arrays, volumes, volume groups, host connections, and the like. Once the hardware resources are configured, the configured resources can be used for such applications as Copy Services applications (e.g., Flash Copy, Metro Mirror, Global Mirror).

Some programs implement a CLI as a pair of client/server programs. Generally speaking, in these scenarios the client and server are tightly coupled, that is a change in one half (e.g., the client) requires a corresponding change in the other half (e.g., the server). This may be problematic, for while there may be few servers to update with any changes, clients are usually more numerous and are installed in many locations. A further problem is that a client for a particular type of server (e.g., storage server) will not work with different servers, even of the same server type.

SUMMARY OF THE INVENTION

In the high end computing storage environment, efforts have been underway to consolidate control of the various computing resources of the environment into a single management location. In one scenario, a number of different types of storage (e.g., disk, tape, network attached storage (NAS)) may be viewed/controlled by a graphical user interface (GUI) application. However, while a GUI application in the traditional sense may be beneficial in some cases, there are other situations where CLI functionality is better suited, such as control and facilitation of automated backups. There is currently no CLI-based solution for providing single management control of a wide variety of computing resources that may be logically or physically positioned in a number of locations.

In light of the foregoing, a need exists for a CLI-based solution to consolidate computing resources into a single management point. Accordingly, in one embodiment, by way of example only, a method for implementing a command line interface (CLI) browser for a client/server pair in a computing environment is provided. A protocol is initialized. The protocol operates on a CLI command, breaking a close coupling between the client/server pair. The protocol facilitates receiving a command query about the CLI command from the client to the server, and sending data representative of the CLI command from the server to the client.

In another embodiment, by way of example only, a command line interface (CLI) browser for a client/server pair in a computing environment implementing a protocol operating on a CLI command, the protocol breaking a close coupling between the client/server pair, is provided. A request module is operable on the client for sending a command query about the CLI command from the client to the server. A receive module is in communication with the request module. The receive module is adapted for receiving data representative of the CLI command from the server to the client.

In still another embodiment, by way of example only, a computer program product for implementing a command line interface (CLI) browser for a client/server pair in a computing environment is provided. The computer program product comprises a computer-readable storage medium having computer-readable program code portions stored therein. The computer-readable program code portions comprise a first executable portion for initializing a protocol operating on a CLI command, the protocol breaking a close coupling between the client/server pair. The protocol facilitates receiving a command query about the CLI command from the client to the server, and sending data representative of the CLI command from the server to the client.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
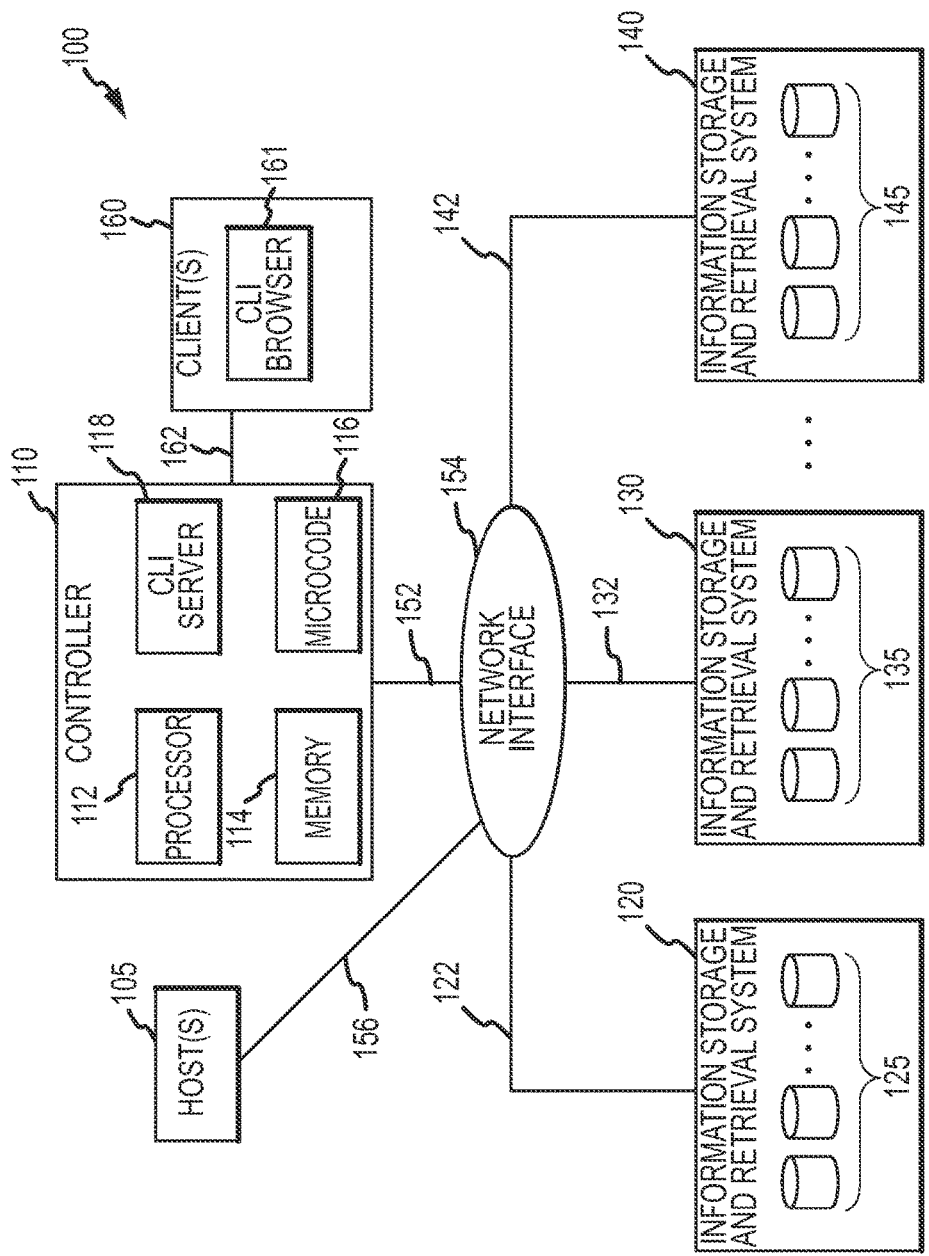
FIG. 1 illustrates an exemplary computing environment in which aspects of the present description and following claimed subject matter may be implemented.

The following description and claimed subject matter set forth exemplary embodiments for implementing a CLI browser for a client/server pair. The CLI browser, in some respects, may be comparable to a browser used for the World Wide Web (WWW). The CLI browser embodiments may be implemented as a protocol operating on a CLI command. The protocol functions to break loose the close coupling between the client and server. For example, a client will, by default, have no knowledge of any one server, just as a client running a web browser has no knowledge of a web server until a universal resource locator (URL) is entered by a user.

The client, through the use of the CLI browser, may download a list of available commands from a particular server, including any parameter checking information. In addition, the client may also be responsible for displaying the results of any queries, including any sorting or filtering operations. An advantage to implementing a CLI browser is that when the server is updated (which may occur frequently), the client will not need an update. In addition, the same client may be used to communicate to any type of CLI server. This would allow, for example, the user to stop an application on a host, perform a copy of data to a backup disk, start the application on the host, and then copy the backup to tape, all from the same CLI script, using the same CLI browser.

A further advantage of implementing a CLI browser is that the CLI would function more effectively than the aforementioned GUI for automated scripts, and for where transport control protocol/internet protocol (TCP/IP) connectivity is not available. While a CLI browser would be designed to operate over TCP/IP, the browser functionality may be applied to other communications protocols such as universal serial bus (USB), inter-integrated circuit (I2C), RS232, or any other hardware communication type.

Since the CLI browser, in its simplest sense, is a protocol, the code operable on the client may be written in any language and for any computing platform and operating environment. A subset of the code and the communications and parsing routines could be embedded in other programs, thus increasing performance by not requiring the CLI to use an operating system exclusively.

The various exemplary embodiments of CLI browsers as further described are operable on, or are operable in conjunction with, two separate entities. These entities are referred to herein as the "client" and "server." The client and server may be implemented on a computer system or computer subsystem, such as a storage subsystem, as one skilled in the art will appreciate. Various aspects of the client and server may be implemented in hardware, software, firmware, or a combination thereof to suit a particular application. The client and server may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning to FIG. 1, an exemplary computing environment 100 is depicted capable of incorporating and using one or more aspects of the following claimed subject matter. As one skilled in the art will appreciate, however, the depicted exemplary embodiment is only one representation of a variety of configurations in which one or more aspects of the claimed subject matter may be implemented.

Environment 100 includes a controller 110 in combination with a plurality of information storage and retrieval systems. For example, in the illustrated embodiment of FIG. 1, environment 100 includes controller 110 in combination with information storage and retrieval systems 120, 130, 140, and additional systems not shown.

In certain embodiments, environment 100 further includes a network interface 154. Network interface 154 may be, for example, a Storage Attached Network ("SAN"), a local area network (LAN), a wide area network (WAN), a private network or combinations thereof. In these embodiments, controller 110 is capable of communicating with network interface 154 via communication link 152.

Controller 110 includes processor 112, memory 114, microcode 116, and CLI server 118. In certain embodiments, memory 114 comprises non-volatile memory, such as for example, one or more EEPROMs (Electrically Erasable Programmable Read Only Memory), one or more flash PROMs (Programmable Read Only Memory), battery backup RAM, hard disk drive (HDD), combinations thereof, and the like. Controller 110 may be deemed a "storage controller" as controller 110 is responsible for at least a portion of storage systems 125, 135, and 145.

One or more command line interface (CLI) clients 160 are connected to the controller 110 via communication link 162. The clients 160 may be transient, in that the clients 160 may be started and stopped repeatedly based on a particular need. The clients 160 may, or may not, be run on the same machine as the server and the CLI browser.

CLI browser 161 may be a script which is executed on the CLI clients 160. In certain embodiments, communication link 162 may be implemented as network interface 154. Additionally, controller 110 further includes CLI server 118 for providing communications between a CLI client 160 and the network interface 154. Host computer 105 is capable of communication with any of the components of environment 100 using network interface 154 via communication link 156. In other embodiments, host computer 105 may communicate with any of the components of environment 100 directly using for example, a host adapter.

In the illustrated embodiment of FIG. 1, controller 110 is external to each of Applicant's information storage and retrieval systems comprising environment 100. In other embodiments, controller 110 is integral with one of the information storage and retrieval systems comprising environment 100. Additionally, more than one controller 110 may be implemented in a particular application.

Controller 110 is capable of bidirectional communication with information storage and retrieval systems 120, 130, and 140, using network interface 154, communication link 152 and communication links 122, 132, and 142, respectively. In the illustrated embodiment of FIG. 1, controller 110 communicates with a plurality of information storage and retrieval systems using network interface 154, such as for example, a storage area network (SAN). In other embodiments, controller 110 may also communicate directly with any of the information storage and retrieval systems. In yet other embodiments, controller 110 communicates directly with one or more information storage and retrieval systems, and with one or other information storage and retrieval systems using network interface 154.

Communication links 122, 132, 142, 152, 162 and 182, are independently selected from the group comprising a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

While communication links 122, 132, 142, 152, 162, and 182 facilitate communications between various components of the environment 100, the skilled artisan should note the link 162 in view of the present description and claimed subject matter. Link 162 allows for the close coupling between the CLI server 118 and CLI client 160 to be broken, as the CLI server may be physically and/or logically located apart (i.e., operational on the controller 110) from the CLI client 160. CLI browser 161 may be adapted to target and leverage link 162 between the CLI server 118 and the CLI client 160. As will be further described, CLI browser 161 in conjunction with CLI server 118 and link 162 may be adapted to implement a protocol operational on a CLI command to facilitate such a loose connection between client and server.

Information storage and retrieval system 120 includes a plurality of information storage media 125. In certain embodiments, plurality of information storage media 125 comprises one or more hard disk drives, one or more tape storage media, one or more optical storage media, one or more electronic storage media and combinations thereof.

Information storage and retrieval system 130 includes a plurality of information storage media 135. In certain embodiments, plurality of information storage media 135 comprises one or more hard disk drives, one or more tape storage media, one or more optical storage media, one or more electronic storage media, and combinations thereof.

Information storage and retrieval system 140 includes a plurality of information storage media 145. In certain embodiments, plurality of information storage media 145 comprises one or more hard disk drives, one or more tape storage media, one or more optical storage media, one or more electronic storage media and combinations thereof.

As those skilled in the art will appreciate, information and retrieval storage systems 120, 130, and 140, may comprise elements in addition to the plurality of storage media shown. As those skilled in the art will further appreciate, such information storage and retrieval systems may further include, without limitation, one or more processors, one or more data buffers, one or more DASD devices, one or more data caches, one or more input/output adapters, one or more storage device adapters, one or more operator input panels, one or more web servers, one or more robotic accessors, one or more data storage devices which include the plurality of storage media 125 and the like.

Referring again to FIG. 1, consider an example of a CLI command submitted to the storage computing environment from the client 160. The client 160 performs syntax checking of the command and its parameters. As a next step, The CLI command and parameters are sent from the client 160 to the CLI server 118. At the CLI server 118, software will build one or more packages that contain commands/requests to be processed by microcode 116. Once the package is built, network interface (NI) software sends the package to a network interface node. The network interface node may be incorporated into the CLI server 118 or elsewhere. From there, the package is sent across to the kernel to be processed by the specialized microcode 116 that would handle the command/request from the client 160. While the depicted embodiment illustrates the functionality of a CLI browser within the context of a storage computing environment, one skilled in the art will appreciate that CLI browser 161 may be operable on any number of client/server pair implementations.

Figure 2:
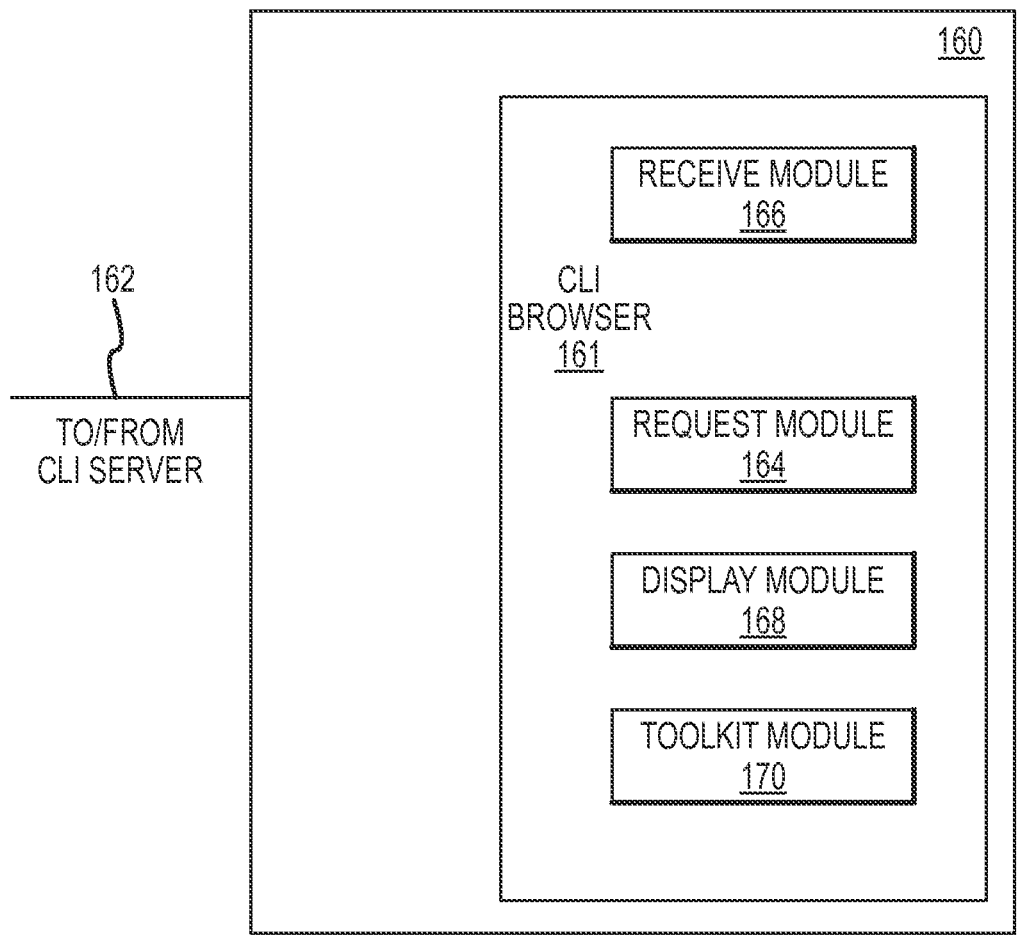
FIG. 2 illustrates block diagram functionality of an exemplary CLI browser operational on one or more clients.

Turning to FIG. 2, exemplary block diagram functionality of a CLI browser 161 operable on one or more clients 160 is depicted. For purposes of the depicted embodiment, the "server" paired with the client 160 is the CLI server 118 (FIG. 1) via communication link 162. However, the server may be another server, located in a different computing environment or even on the same machine as the client 160. As previously mentioned, a wide variety of clients may be paired with a wide variety of servers by use of a CLI browser 161.

CLI browser 161 is operable on the client 160. CLI browser 161 includes a request module 164, a receive module 166 operable in conjunction with the request module, a display module 168 operable in conjunction with the request and receive modules, and a toolkit module operable in conjunction with the request, receive, and display modules. Each of the various modules is adapted to perform functionality relating to the operation of the CLI browser as will be further described below. Generally speaking, however, the request module may function to send a request for information to the server, the receive module may function to receive the information from the server (caching the information in program memory), and the display module may function to provide the information to the client for display to a user.

Request module 164 and receive module 166 may be implemented in such a way that during operation of the CLI browser 161, the client 160 has no specific knowledge of the server 118 (FIG. 1), but only a basic knowledge of how to communicate with the server 118. In one embodiment, the request module 164 may use a meta language to request information on what commands, parameters, and values are available, and what parameter checking is required. This meta language used for this request may be conceptually similar to the hypertext transfer protocol (HTTP) utilized in a web browser. The meta language, however, is enhanced to meet the specialized needs of a CLI.

Actual data received from the server may, in one embodiment, be an extensible language format to provide compatibility across a wide variety of computing platforms. For example, the data may be compatible with extensible markup language (XML) or formatted similarly. Conceptually speaking, the extensible format may be partially analogous to hypertext markup language (HTML) used in a web browser.

For performance reasons, the information from the server may be only downloaded on demand. That is, information for any particular command is downloaded only if the user attempts to use that command or requests information on that command. Additionally, each server may be required to have a unique identification type and version number. This allows the client to cache the data to a file on the local file system for improved performance. If the server code is updated, or the CLI switches to another server type, it may then be automatically recognized, and the CLI may respond appropriately. Accordingly, the data currently in program memory may be flushed to the current file for that server type and version. The program memory may then be reset. The file of the new server type or version may then be opened. Finally, the program memory may then be initialized with the new server type and version. Authentication and authorization may be provided on the server on a continuing basis.

Returning to FIG. 2, a toolkit module may be adapted to provide a toolkit to users to assist in the creation of CLI servers. Using this toolkit, a wrapper may quickly be written around existing CLIs, thus preserving the existing CLI (perhaps entitled) and providing a new CLI (now chargeable) at the same time. New CLIs may be produced in half the time since the client exists and does not require any changes by definition, and the toolkit provides half of the server. While the depicted embodiment shows toolkit module 170 operational on CLI browser 161, in other embodiments toolkit module 170 may be adapted to be operational on the CLI server 118 or elsewhere on controller 110 (FIG. 1) In such alternative embodiments, the flexibility of link 162 (FIG. 1) may be fully leveraged.

Figure 3:
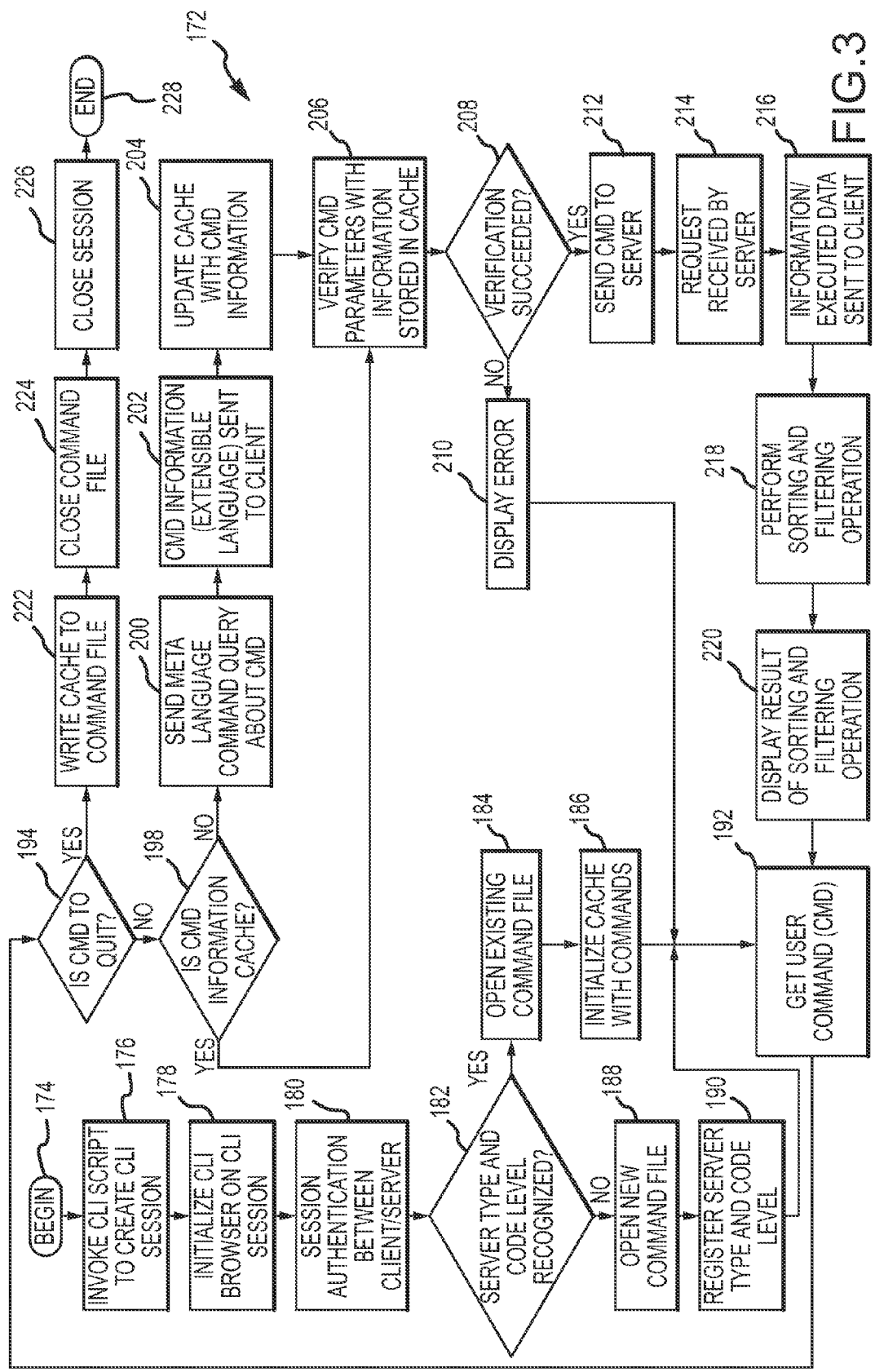
FIG. 3 illustrates an exemplary method of operation of a CLI browser between a client and server pair.

FIG. 3 following illustrates an exemplary method 172 of operation of a CLI browser between a client and server pair. As one skilled in the art will appreciate, various steps in the methods may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

FIG. 3 begins (step 174) by a user invoking a CLI script to create a CLI session (step 176), while initializing the CLI browser on the CLI session (step 178). Here, the skilled artisan will appreciate that the CLI browser may be implemented in several ways. The CLI session may be one and the same as the CLI browser, or the browser may function as a plug-in-application on the CLI session. In any event, the CLI browser is initialized, and session authentication between the client and server takes place (step 180). The server authenticates the session request and establishes a connection.

Once a connection is established, if the server type and code level is recognized by the client (step 182), then an existing command file is opened (step 184), and the cache is initialized with a list of available commands (step 186) in the existing command file. If the server type and code level is not recognized, then a new command file is opened (step 188). The client registers the unique identification type and/or version number of the server (step 190).

The CLI browser then gets a user command (step 192). If the command is to quit (step 194), then the method 172 moves to step 222 and prepares to close the CLI session as will be further described. If the command information is not found in cache (step 198), then a meta language command query about the command is sent to the server (step 200). The command query may include a request for parameters, values, and parameter checking relevant to the command. The server executes the request and returns the command (and additional information) to the client in the extensible language. The cache is updated with the command information (step 204).

In any event, once the command information is received, or it is determined that the command information is preexisting in cache, the command parameters are verified with the information stored in cache (step 206). If the verification succeeds (step 208), then the method 172 moves to step 212. If not, then an error is displayed to the user (step 210), and the method returns to step 192.

Pursuant to a successful verification (again, step 208), the command is sent to the server (step 212) by the client. The command is received by the server (step 214). The server executes on the command request and provided information/executed data to the client in an extensible language (step 216). The client, as previously described, may be responsible for querying the server for specific information, such as requests for performing a sorting and/or filtering operation (step 218). The result of the sorting and/or filtering operation is displayed (step 220).

At the conclusion of a CLI browser session, the method 174 writes the cache to a command file (step 222). The command file is closed (step 224) and the session is closed (step 226). The method 174 then ends (step 228).

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for implementing a command line interface (CLI) browser in computing environments including one or more clients and a plurality of servers, comprising:

initializing a CLI browser operating on a CLI command upon a user invoking a CLI script to create a CLI session, the CLI browser functioning as a plug-in application on the CLI session and breaking a close coupling between the client and each of the plurality of servers when the client and each respective server form a client/server pair such that the CLI browser, without inquiring, does not have hard-coded knowledge to which server the client is currently paired, wherein the CLI browser is configured to:

connect to a server, transmit, without user input, a command query from the client to the server to which the client is currently paired upon connection to the server, the command query requesting CLI commands on the server, each of which the CLI browser has no knowledge prior to issuing the command query, receive data representative of the CLI commands from the server to which the client is currently paired; wherein a subset of code of the CLI browser and associated communications and parsing routines implemented on the client are embedded in at least one of a plurality of applications executing on the client, such that the CLI browser is not limited to an exclusive operating system, and upon connecting to the server, determine whether a server type of a plurality of server types and code level is recognized for the server to which the client is currently paired such that if an alternative server type and code level is switched to, the CLI browser automatically recognizes the alternative server type and code level, flushes a program memory of the client to a current command file having alternative CLI commands for the alternative server type and code level wherein the current command file is opened, and initializes the program memory of the client with the alternative server type and code level; and wherein each of the plurality of server types is associated with a respective unique identification type, version number, and respective sets of the CLI commands defined and stored in a repository of the server such that the current command file is correlated to a specific one of the plurality of server types, the client receiving a respective set of the CLI commands into the current command file for a respective server type from the repository upon transmitting the command query comprising a command request representative of one of the CLI commands to the server; wherein at least one of the plurality of server types comprising the server is a storage server.

2. The method of claim 1, wherein the CLI browser is further configured to receive the data in a meta language.

3. The method of claim 1, wherein the CLI browser is further configured to receive the data in an extensible language.

4. The method of claim 1, wherein the CLI browser is further configured to initialize a cache operable on the client with a plurality of CLI commands including the CLI command from an existing command file.

5. The method of claim 4, wherein the CLI browser is further configured to, if the server type and code level is not recognized:
   open a new command file, and
   register the server type and code level.

6. The method of claim 1, wherein the CLI browser is further configured to perform at least one of a sorting and filtering operation associated with the CLI command.

7. The method of claim 6, wherein the CLI browser is further configured to display a result of the at least one of the sorting and filtering operation associated with the CLI command to a user.

8. The method of claim 1, wherein the CLI browser is further configured to execute on the CLI command received by the server from the client to which the client is currently paired.

9. A system for implementing command line interface (CLI) browsers in computing environments, comprising:
   a client;
   a plurality of servers capable of being coupled to the client; and
   a CLI browser coupled to the client and the plurality of servers initialized upon a user invoking a CLI script to create a CLI session, the CLI browser functioning as a plug-in application on the CLI session and configured to break a close coupling between the client and each of the plurality of servers when the client and each respective server form a client/server pair such that the CLI browser, without inquiring, does not have hard-coded knowledge to which server the client is currently paired, the CLI browser comprising:
   a connect module for connecting to a server;
   a request module operable on the client for sending, without user input, a command query from the client to the server to which the client is currently paired upon connection to the server, the command query requesting CLI commands on the server, each of which the CLI browser has no knowledge prior to issuing the command query; and
   a receive module in communication with the request module, the receive module adapted for receiving data representative of the CLI commands from the server to which the client is currently paired; wherein a subset of code of the CLI browser and associated communications and parsing routines implemented on the client are embedded in at least one of a plurality of applications executing on the client, such that the CLI browser is not limited to an exclusive operating system; wherein upon connecting to the server, the CLI browser determines whether a server type of a plurality of server types and code level is recognized for the server to which the client is currently paired such that if an alternative server type and code level is switched to, the CLI browser automatically recognizes the alternative server type and code level, flushes a program memory of the client to a current command file having alternative CLI commands for the alternative server type and code level wherein the current command file is opened, and initializes the program memory of the client with the alternative server type and code level; and wherein each of the plurality of server types is associated with a respective unique identification type, version number, and respective sets of the CLI commands defined and stored in a repository of the server such that the current command file is correlated to a specific one of the plurality of server types, the client receiving a respective set of the CLI commands into the current command file for a respective server type from the repository upon transmitting the command query comprising a command request representative of one of the CLI commands to the server; wherein at least one of the plurality of server types comprising the server is a storage server.

10. The system of claim 9, wherein the request module is further adapted for sending a request for available parameters, available values, and required parameter checking to the server to which the client is currently paired.

11. The system of claim 9, further including a display module operable in conjunction with the receive module, the display module adapted to display a result of the CLI command query.

12. The system of claim 9, wherein the request module is further adapted for sending the command query in a meta language, and the receive module is further adapted for receiving data representative of the CLI command in an extensible language.

13. The system of claim 11, wherein the display module is further adapted for:
   configuring the client to perform a sorting operation or filtering operation associated with the CLI command, and
   displaying a result of the sorting or filtering operation to a user.

14. The system of claim 9, wherein the request module is adapted for operation over a Transport Control Protocol/Internet Protocol (TCP/IP) communications protocol, a Universal Serial Bus (USB) communications protocol, an inter-integrated circuit (I2C) communications protocol, and an RS232 communications protocol.

15. The system of claim 9, wherein the extensible language is compatible with an extensible markup language (XML) format.

16. The system of claim 9, further including a toolkit module operable in conjunction with the request module, the toolkit module adapted for creating a wrapper around an existing CLI.

17. The system of claim 9, wherein the receive module is further adapted for registering the unique identification type and version number of the server for caching data to a file.

18. A computer program product for implementing a command line interface (CLI) browser in computing environments including one or more clients and a plurality of servers, the computer program product comprising a non-transitory computer-readable storage medium having computer-readable program code portions stored therein, the computer-readable program code portions comprising:
  a first executable portion for initializing a CLI browser operating on a CLI command upon a user invoking a CLI script to create a CLI session, the CLI browser functioning as a plug-in application on the CLI session and breaking a close coupling between the client and each of the plurality of servers when the client and each respective server form a client/server pair such that the CLI browser, without inquiring, does not have hard-coded knowledge to which server the client is currently paired, wherein the CLI browser facilitates:
    connecting to a server,
    transmitting, without user input, a command query from the client to the server to which the client is currently paired upon connection to the server, the command query requesting CLI commands on the server, each of which the CLI browser has no knowledge prior to issuing the command query,
    receiving data representative of the CLI commands from the server to which the client is currently paired; wherein a subset of code of the CLI browser and associated communications and parsing routines implemented on the client are embedded in at least one of a plurality of applications executing on the client, such that the CLI browser is not limited to an exclusive operating system, and
    upon connecting to the server, determining whether a server type of a plurality of server types and code level is recognized for the server to which the client is currently paired such that if an alternative server type and code level is switched to, the CLI browser automatically recognizes the alternative server type and code level, flushes a program memory of the client to a current command file having alternative CLI commands for the alternative server type and code level wherein the current command file is opened, and initializes the program memory of the client with the alternative server type and code level; and wherein each of the plurality of server types is associated with a respective unique identification type, version number, and respective sets of the CLI commands defined and stored in a repository of the server such that the current command file is correlated to a specific one of the plurality of server types, the client receiving a respective set of the CLI commands into the current command file for a respective server type from the repository upon transmitting the command query comprising a command request representative of one of the CLI commands to the server; wherein at least one of the plurality of server types comprising the server is a storage server.

19. The computer program product of claim 18, wherein the CLI browser further facilitates transmitting the command query in a meta language.

20. The computer program product of claim 18, wherein the CLI browser further facilitates sending the data in an extensible language.

* * * * *